G. B. NORGRAVE.
MACHINE FOR TREATING HIDES, SKINS, AND LEATHER.
APPLICATION FILED DEC. 9, 1907.

982,523.

Patented Jan. 24, 1911.
5 SHEETS—SHEET 1.

G. B. NORGRAVE.
MACHINE FOR TREATING HIDES, SKINS, AND LEATHER.
APPLICATION FILED DEC. 9, 1907.

982,523.

Patented Jan. 24, 1911.

5 SHEETS—SHEET 2.

G. B. NORGRAVE.
MACHINE FOR TREATING HIDES, SKINS, AND LEATHER.
APPLICATION FILED DEC. 9, 1907.

982,523.

Patented Jan. 24, 1911.

5 SHEETS—SHEET 3.

G. B. NORGRAVE.
MACHINE FOR TREATING HIDES, SKINS, AND LEATHER.
APPLICATION FILED DEC. 9, 1907.

982,523.

Patented Jan. 24, 1911.

5 SHEETS—SHEET 4.

Witnesses.

Inventor:
George B. Norgrave
Jas. H. Churchill
atty.

UNITED STATES PATENT OFFICE.

GEORGE B. NORGRAVE, OF PEABODY, MASSACHUSETTS, ASSIGNOR TO WITCH MANUFACTURING COMPANY, OF SALEM, MASSACHUSETTS, A CORPORATION OF MAINE.

MACHINE FOR TREATING HIDES, SKINS, AND LEATHER.

982,523.     Specification of Letters Patent.     Patented Jan. 24, 1911.

Application filed December 9, 1907. Serial No. 405,693.

*To all whom it may concern:*

Be it known that I, GEORGE B. NORGRAVE, a citizen of the United States, residing in Peabody, county of Essex, and State of Massachusetts, have invented an Improvement in Machines for Treating Hides, Skins, and Leather, of which the following description, in connection with the accompanying drawings, is a specification, like letters on the drawings representing like parts.

This invention relates to a machine for treating hides, skins and leather and is herein shown as embodied in a machine especially designed and adapted for treating the thick portions of the hide or skin so as to remove a portion thereof and reduce the thickness of the same.

The present invention has for its object to provide a simple and efficient machine for the purpose specified, in which the thick portion of the hide or skin, such as the neck portion, is drawn across a knife by a movable clamp, and is backed up by a pressure or gage roll while being cut, provision being made for automatically opening and closing said clamp and for moving said pressure roll away from the knife. Provision may also be made for smoothing out the neck portion of the hide or skin prior to its being presented to the knife. These and other features of this invention will be pointed out in the claims at the end of this specification.

Figure 1:
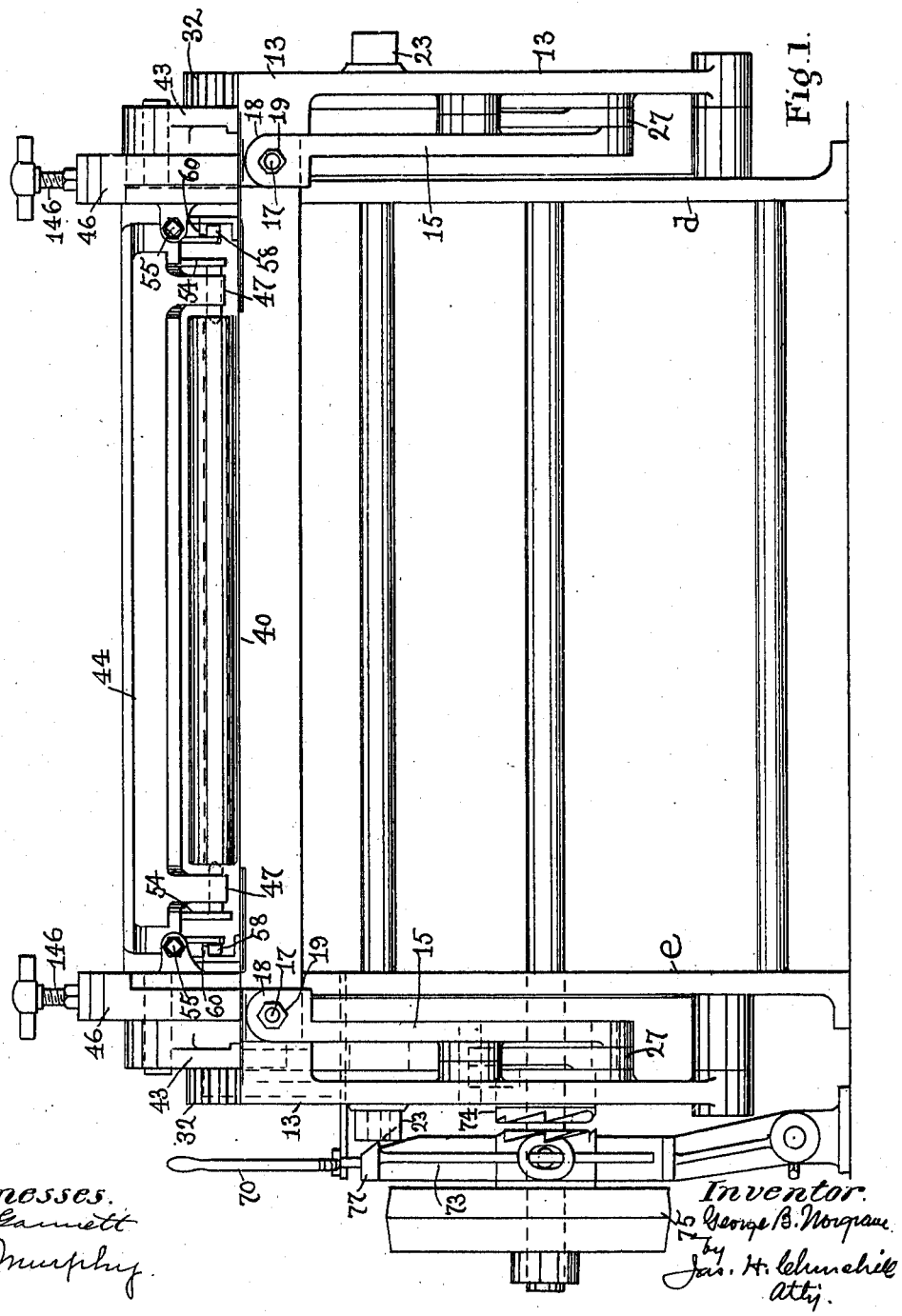
Figure 2:
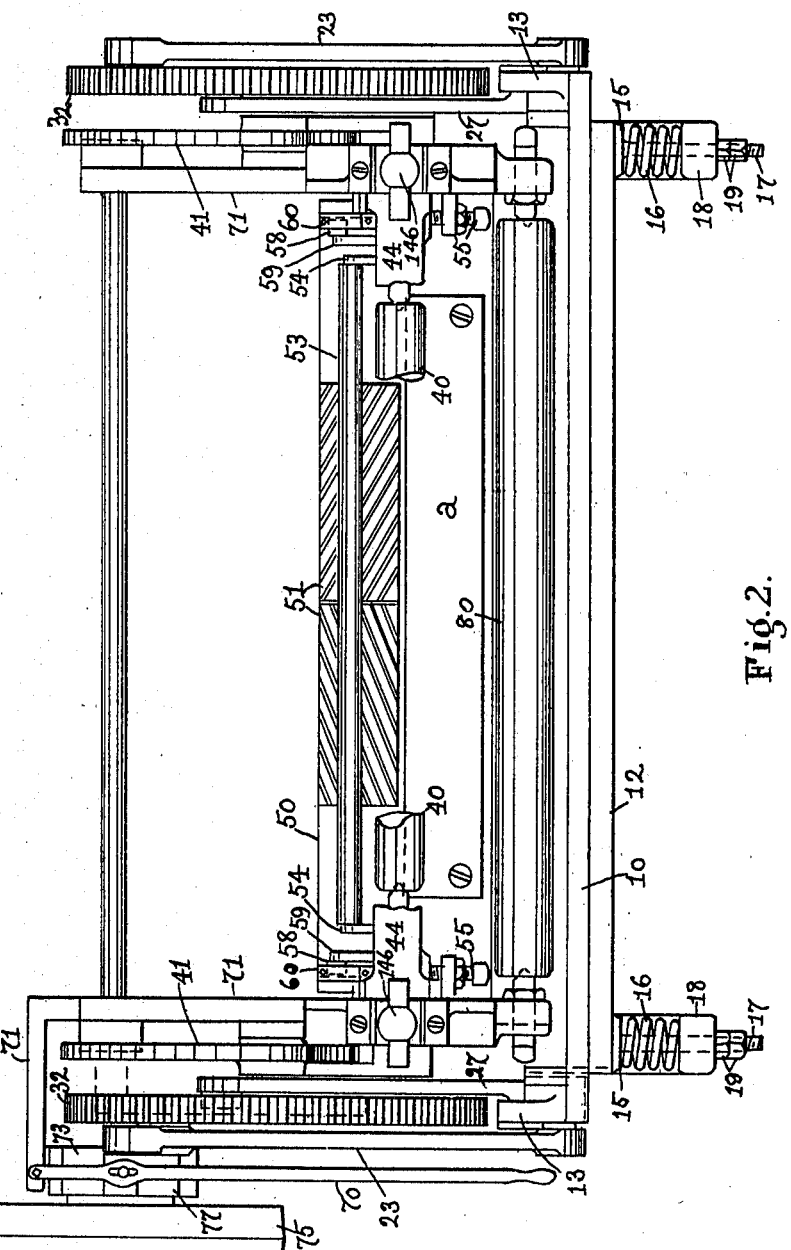
Figure 3:
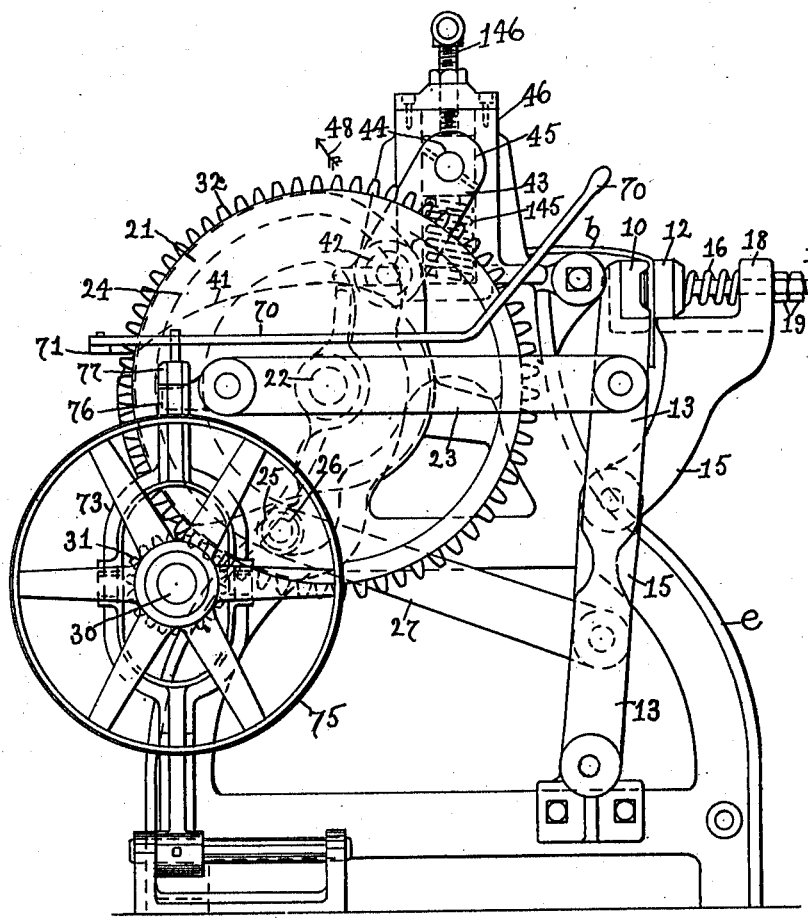
Figure 5:
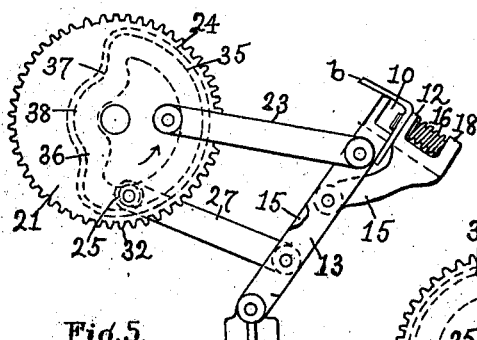
Figure 6:
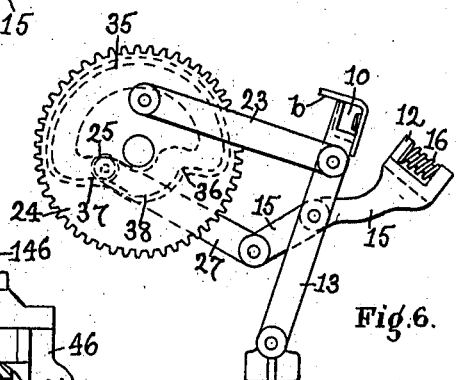
Figure 4:
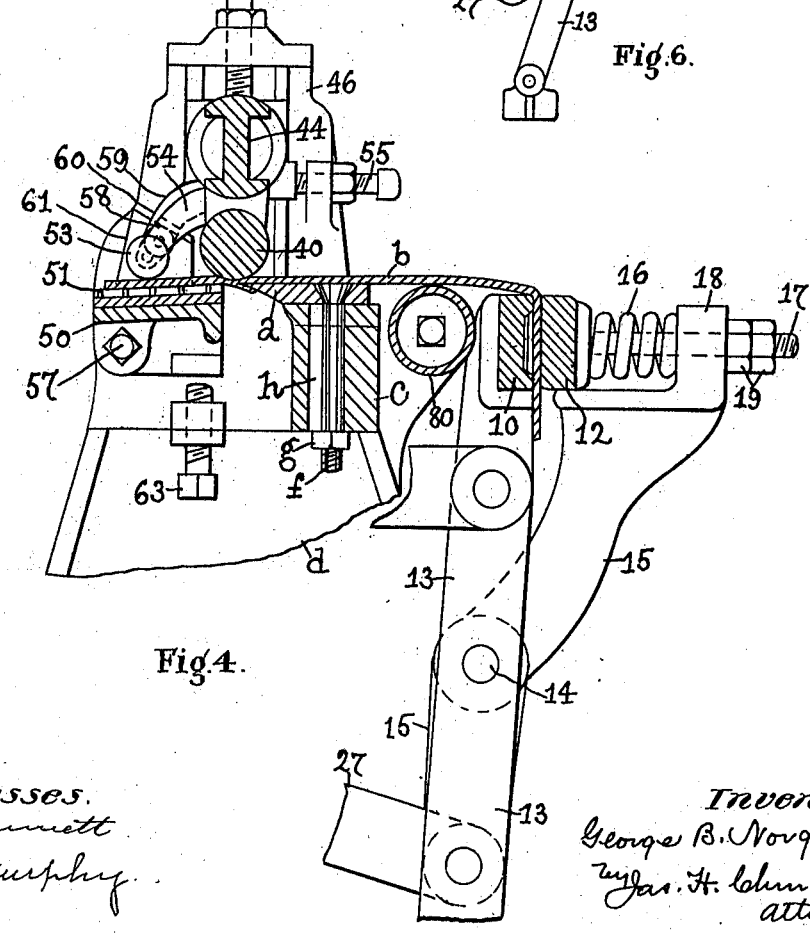
Figure 7:
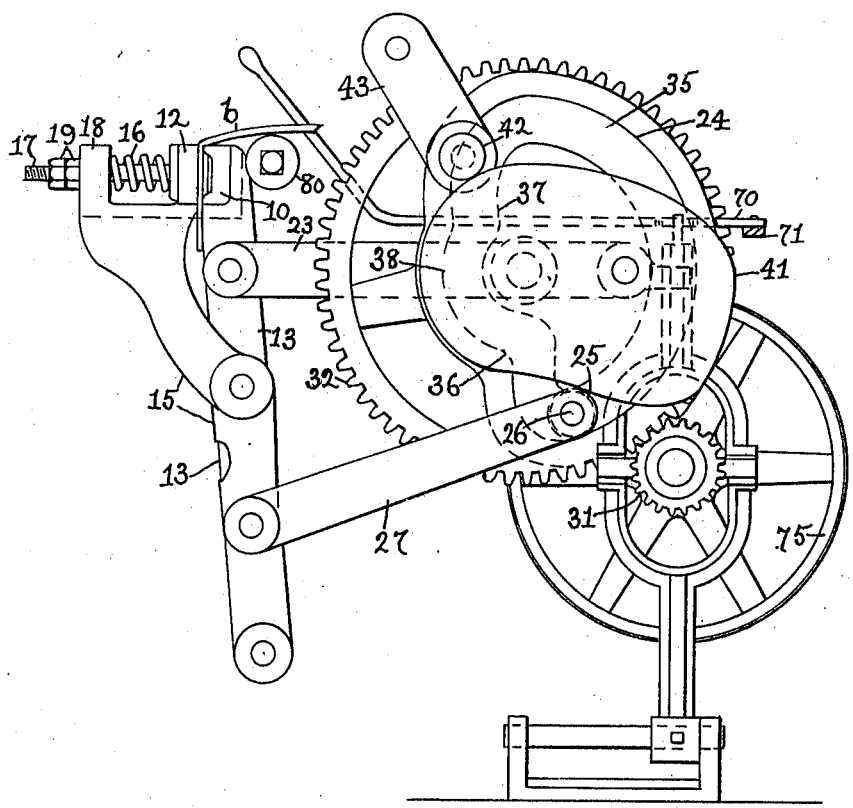

Figure 1 is a front elevation of a machine embodying this invention. Fig. 2, a plan of the machine shown in Fig. 1. Fig. 3, a side elevation of the machine shown in Fig. 1. Fig. 4, a detail in section to be referred to. Figs. 5, 6 and 7, details of the clamp and its operating mechanism.

Referring to the drawings and especially Fig. 4, *a* represents a knife to which the thick portion of the hide, skin or leather *b* is presented for the purpose of reducing in thickness said thick portion, usually the neck.

The knife *a* is herein shown as fastened to a cross-piece or bed *c* extended transversely of the machine and secured to side frames *d*, *e*. The knife *a* is secured to the bed *c* as herein shown by bolts *f* and nuts *g*, said bolts being extended down through slots *h* in the bed, which slots are made longer than the diameter of the said bolts to enable the knife to be adjusted and thereby compensate for wear in grinding the same. The knife *a* is designed to cut into the underside of the neck or other thick portion of the hide or skin, and remove a portion thereof and thereby reduce the thickness of the neck portion, as the hide or skin is drawn across the knife by a clamping mechanism as will be described.

The clamping mechanism referred to, comprises two members or jaws 10, 12, extended transversely of the machine and may be of any suitable or desired construction, and in the present instance said members are shown as bars. The clamping member 10 is secured at its ends to substantially upright levers 13, pivoted at their lower ends to the side frames of the machine. The clamping member 12 is supported upon the upper surfaces of levers 15, which are pivoted intermediate their ends at 14 to the levers 13, (see Figs. 3 and 4). The clamping member 12 is capable of bodily movement on the levers 15 and is yieldingly held in engagement with the hide or skin, by helical springs 16, which encircle guide rods 17 attached at one end to the member 12 and extended through lugs 18 on said levers, said guide rods being provided with nuts 19, which limit the forward movement of the member 12 under the influence of the springs 16, and enable the said member to be adjusted to hides or skins of different thickness.

The clamping members 10, 12 are designed to be moved in unison in order to draw the hide or skin across the cutting edge of the knife, and also to have one of said members moved independently of the other, so that said members may be opened or separated, to permit the insertion of an untreated hide or skin and to permit the removal of the treated hide or skin. In the present instance, I have shown one construction of mechanism for accomplishing this purpose, but I do not desire to limit my invention to the particular construction shown. The movement of both members of the clamp is effected by disks or wheels 21 (see Fig. 3) mounted on a rotatable shaft 22, supported by the side frames of the machine, said disks being connected off their center with the levers 13 by links or rods 23.

The movement of the clamping member 12 independently of the member 10 is effected by path cams 24 (see Figs. 3 and 7) secured to or forming part of the disks or wheels 21, and into which are extended rollers 25 on studs 26 carried by one end of links or rods 27, having their other end pivotally connected with the lower end of the levers 15. The shaft 22 may be rotated in any suitable manner, and in the present instance it is rotated from a main shaft 30 by a pinion 31 thereon meshing with gear teeth 32 on the circumference of one of the disks 21 (see Fig. 3). In the rotation of the disks 21, the levers 13 are oscillated on their pivots, and their upper ends carrying the clamping member 10 are moved away from the knife and then moved back toward the knife. The path cams 24 are made so that on the outward movement of the levers 13 away from the knife, the levers 15 are held in fixed relation to the levers 13 and the clamping member 12 is maintained in its closed position shown in Fig. 3, with the result that the hide or skin $b$ clamped between said members is drawn across the cutting edge of the knife $a$, and a portion of the said hide or skin is split or cut off to reduce the thickness of the same. In practice the neck portion of the hide or skin will thus be treated, as this portion is materially thicker than the body portion. The path cams 24 are also suitably shaped to move the levers 15 independently of the levers 13, so that the clamping members are opened to permit the treated hide or skin to be removed from the clamping members and an untreated hide or skin to be inserted between the same, and so that the levers 15 are moved to again close the clamping member 12 and firmly grip the hide or skin between it and the member 10.

As represented in Figs. 3, 5, 6 and 7, the path cam is provided with a substantially semi-circular portion 35, which maintains the lever 15 in substantially fixed relation to the lever 13 while the disks 21 are making substantially one half revolution or from the position shown in Fig. 3 to that shown in Fig. 5. During this movement, which may be termed the outward movement, the hide or skin is firmly clamped between the members 10, 12 and is drawn through the machine, and the thick portion, which it is desired to reduce in thickness, is drawn over the knife and is cut or split by the same. The cam path is further provided with two cam portions 36, 37 on opposite sides of the center, which act on the roll 25 to open and close the member 12, that is, when the cam portion 36 engages the roll 25, it acts on the latter to move the lever 15 and turn the upper end of the same away from the upper end of the lever 13, thereby opening the clamping jaw or member 12, which is held open while an intermediate circular portion 38 of the cam path is traveling by the roll 25, after which the cam portion 37 engages the roll and turns the lever 15 back so as to close the jaw or member 12.

While the jaw or member 12 is in its open position, the treated hide or skin can be removed by the operator and an untreated hide or skin inserted between said jaws. On the return movement of the clamping members or jaws, the neck or other thick portion of the hide or skin is pushed into position to be acted upon by the knife. The hide or skin while being cut, is pressed down against the cutting edge of the knife by a gage or pressure roller 40, which determines the depth of the cut, and provision is made for automatically raising and lowering said roller, which may be accomplished as herein shown by a cam 41, shown as a peripheral cam, which is fast on the shaft 22 to rotate therewith and which acts on a roller 42 carried by a crank, arm or lever 43 fast on a rock shaft 44, which is mounted to turn in bearing boxes 45 vertically movable in guideways in uprights 46 supported by the framework of the machine. The shaft 44 has fast on it depending cranks or arms 47 (see Fig. 1), in which is journaled the pressure or gage roller 40. The cam 41 is suitably shaped to turn the crank or arm 43 upward or in the direction indicated by the arrow 48, (Fig. 3), and thereby rock the shaft 44 so as to swing the pressure roll 40 up in the direction of the arrow 48 and thus lift it away from the knife $a$ a sufficient distance to permit the neck or other thick portion of the hide or skin to be inserted by the operator into the machine and into position to be drawn across the knife, and when the hide or skin is properly positioned on a table 50, the cam 41 permits the pressure roller to move downward into contact with the hide or skin, which is thus firmly pressed against the cutting edge of the knife to effect the removal of a portion of the thick neck or other part of the hide or skin, and reduce the said part to the desired thickness. The journal boxes 45 rest upon springs 145 and are held from upward movement by the adjusting screws 146.

Provision is made for smoothing out the thick portion of the hide or skin before it is presented to the action of the knife, which may be accomplished as herein shown by providing the table 50 with spreading ribs or vanes 51, which are arranged to extend in opposite directions like the blades of a putting-out roll commonly used in putting-out machines. The weight of the thick portion of the hide or skin may be sufficient to obtain the desired spreading-out effect, but if desired, said thick portion may be pressed against the spreader by a roller 53 journaled in arms 54 attached to the rock-shaft 44, as clearly represented in Fig. 4. The presser roll 40 may be adjusted with relation to the knife a according to the thickness of the hide or skin to be cut, by means of adjusting screws 55 carried by the uprights 46 and adapted to engage the rock-shaft 44.

The table 50 is mounted at one side on a pivot 57 and its free or inner end is held up in its operative position shown in Fig. 4, by studs or rollers 58 on arms 59 attached to the rock-shaft 44 and engaging the underside of cams or inclines 60 on the upright plates 61 attached to and preferably adjustable on the bed 50. The cam plates 61 may be adjustable on the bed 50 toward and from the pressure roll, so that the rollers 58 will bring the bed plate 50 into its operative position at or about the time the pressure or gage roll 40 is lowered into its operative position shown in Fig. 4. When the gage roll 40 is lifted by the cam 41 into its inoperative position, the rollers 58 travel up the inclines or cams 60 and allow the front end of the table to drop down until arrested by stops, shown as screws 63 which are adapted to engage the table near its ends. By lowering the table as described, ample clearance is obtained with a limited upward movement of the roll 40, for the insertion of the thick portion of the hide or skin.

The operation on the skin may be controlled by a lever 70 (see Figs. 1 and 2), pivoted to a bracket or arm 71 attached to the side upright of the machine, said lever being operatively connected to the movable member 73 of a clutch, the stationary member 74 of which is secured to the pinion 31. By moving the lever 70 toward the right in Fig. 2, the pinion 31 is clutched to the pulley 75, which is continuously driven by a belt, not shown. Provision is made for automatically stopping the machine, which may be effected by means of a projection 76 on the end of the connecting rod 23, which is adapted to engage a cam or incline block 77 on the end of the lever 73 (see Fig. 1). The cam block 77 may be adjustably secured to said lever in any suitable manner. If desired an anti-friction roller 80 may be interposed between the knife and the clamping mechanism, over which the hide or skin is drawn by the clamping mechanism as the latter is moved forward or outward.

I have herein shown one construction of apparatus embodying this invention, but I do not desire to limit my invention to the particular construction shown.

Claims.

1. In a machine of the character described, in combination, a substantially horizontal knife, a pressure roller coöperating with the cutting edge thereof, a clamping mechanism comprising clamping members vertically arranged for the passage down between them of the hide or skin and bodily movable toward and from the rear side of the said knife, a rotatable shaft, means operated by said shaft for moving said clamping members bodily, means operated by said shaft for moving one of the clamping members with relation to the other, a table upon which the portion of the material to be cut is supported, spreading ribs or vanes on said table, a roller movable with the pressure roller and coöperating with said spreading ribs, and means for operatively connecting the pressure roller with said shaft, substantially as described.

2. In a machine of the character described, in combination, a substantially horizontal knife having a cutting edge on one side, a pressure roller coöperating with the cutting edge thereof, a clamping mechanism comprising clamping jaws or members bodily movable toward and from the rear side of said knife, vertically arranged levers pivoted at their lower ends and carrying said members above their pivots, means to move said levers in unison and draw the hide or skin across the cutting edge of the knife, and means to move one of said levers with relation to the other, substantially as described.

3. In a machine of the character described, in combination, a knife, a clamping mechanism comprising two members or jaws bodily movable toward and away from the rear side of said knife, means to automatically move said members in unison away from the rear side of said knife to draw the hide or skin across the cutting edge thereof, means to automatically move one of said members with relation to the other to open and close the same, means to force the material toward the knife and hold it in engagement therewith while it is being drawn across the cutting edge thereof, and means to automatically move said forcing means away from said knife, substantially as described.

4. In a machine of the character described, in combination, a substantially flat knife having a cutting edge at one side, a clamping mechanism to engage the hide or skin and bodily movable toward and from the rear side of said knife to draw the hide or skin across the knife substantially at right angles to the length of the knife, mechanism to bodily move said clamping mechanism toward and away from the rear side of said knife, and means to automatically open said clamping mechanism and release said hide, substantially as described.

5. In a machine of the character described, in combination, a knife, clamping jaws to engage the material, levers supporting said clamping jaws, a rotatable shaft, mechanism connecting one of said levers with said shaft to effect movement of both levers toward and away from said knife, a rotatable cam, and mechanism connecting said cam with the other of said levers to move it toward and from the other of said levers, substantially as described.

6. In a machine of the character described, in combination, a knife, clamping jaws to engage the material, levers supporting said clamping jaws, a rotatable shaft, mechanism connecting one of said levers with said shaft to effect movement of both levers toward and away from said knife, a rotatable cam, mechanism connecting said cam with the other of said levers to move it toward and from the other of said levers, a pressure roll coöperating with said knife, and a cam to effect movement of said pressure roll away from said knife, substantially as described.

7. In a machine of the character described, in combination, two clamping jaws, one set of levers supporting one of said jaws, a second set of levers supporting the other of said jaws and pivoted to the first-mentioned set of levers and upon which its clamping jaw is bodily movable, means connected with one set of levers for moving both levers in unison, and means connected with the second set of levers for holding them in fixed relation with the first-mentioned set of levers, and for moving them independently of the first-mentioned set of levers, substantially as described.

8. In a machine of the character described, in combination, a knife, a pressure roll coöperating with said knife, a rocking support for said pressure roll, a pivoted table coöperating with said knife, and means actuated by said rocking support for turning said table on its pivot to move the free end toward the plane of said knife, substantially as described.

9. In a machine of the character described, in combination, a substantially horizontal knife, a clamping jaw over which the hide or skin is placed, a coöperating clamping jaw to grip the hide between it and the first-mentioned jaw, levers supporting said jaws above their pivots and substantially in the plane of said knife to bodily move the said jaws toward and from the knife, a pressure roll to press the leather into engagement with the cutting edge of the knife, means for automatically moving said clamping jaws away from the rear side of the knife to draw the hide or skin across the cutting edge thereof and to move one of said jaws with relation to the other to open and close the same, and means to keep the pressure roll in engagement with the hide or skin while it is drawn across the knife, substantially as described.

10. In a machine of the character described, in combination, a knife, a pressure roll coöperating with said knife and bodily movable toward and from the same, a pivoted table, and means movable with said pressure roll for turning said table into its operative position, substantially as described.

11. In a machine of the character described, in combination, a knife, a pressure roll coöperating with said knife and bodily movable toward and from the same, a table provided with spreading ribs or vanes, and means movable with said pressure roll for pressing the material into engagement with the said spreading ribs or vanes, a rotatable shaft, a cam actuated thereby, and means coöperating with said cam to effect bodily movement of said pressure roll, substantially as described.

12. In a machine of the character described, in combination, a substantially flat knife having a cutting edge at one side thereof, a clamping mechanism to engage the hide or skin and comprising members bodily movable in unison away from the back side of the said knife to draw the hide or skin across the knife in the plane of the latter, and one of which members is movable with relation to the other, means for automatically effecting said movements, and means for pressing the hide or skin against the cutting edge of the knife, while it is being drawn across the same, for the purpose specified.

13. In a machine of the character described, in combination, a substantially flat knife having a cutting edge at one side thereof, a clamping mechanism to engage the hide or skin and comprising members bodily movable in unison away from the back side of the said knife to draw the hide or skin across the upper surface of the knife in the plane of the latter, and one of which members is movable with relation to the other, a rotatable shaft, and mechanism actuated by said rotatable shaft for automatically effecting the movements of said clamping members, for the purpose specified.

14. In a machine of the class described, in combination, a substantially horizontal knife, a clamping jaw over which the hide or skin is placed, a coöperating clamping jaw to grip the hide or skin between it and the first-mentioned jaw, supports for said jaws movable toward and from the knife, one of which supports is movable with relation to the other and both of which are movable simultaneously away from the knife to draw the hide or skin across the cutting edge of the same, a rotatable shaft, and mechanism actuated by said rotatable shaft for effecting the simultaneous and individual movements of said clamping jaws, and means coöperating with said knife to hold the hide or skin in engagement therewith while it is being drawn across the cutting edge thereof, substantially as described.

15. In a machine of the character described, in combination, a knife, a clamping mechanism to engage the hide or skin, supports for said clamping mechanism movable toward and from the knife, mechanism to move said supports simultaneously away from the knife substantially in the plane thereof to draw the hide or skin across the same, and to move one support with relation to the other to release the hide or skin, means to hold the hide or skin in engagement with the knife while it is being drawn across the same, and a rotatable shaft to operate said mechanism, substantially as described.

16. In a machine of the character described, in combination, a knife, a clamping jaw over which the hide or skin is placed, a coöperating clamping jaw to grip the hide or skin between it and the first mentioned jaw, supports for said jaws, one of which supports is movable with relation to the other and both of which are movable simultaneously away from the knife to draw the hide or skin across the cutting edge of the same, a rotatable shaft, and mechanism actuated by said rotatable shaft for effecting the simultaneous and individual movements of said clamping jaws, a presser to hold the hide or skin in engagement with the knife while it is being drawn across the cutting edge thereof, and mechanism actuated by said rotatable shaft for actuating said presser to automatically raise it from said knife, substantially as described.

17. In a machine of the character described, in combination, a knife having a cutting edge at one side thereof, a clamping mechanism to engage the hide or skin and comprising members movable in unison with relation to the said knife to draw the hide or skin across the cutting edge substantially in the plane of the knife, and one of which members is movable with relation to the other, a pressure roll to hold the hide or skin against the cutting edge of the knife while the hide or skin is being drawn across the same by the clamping members, a rotatable shaft, means actuated by said shaft to effect the movements of the clamping mechanism, and means actuated by said shaft for moving the pressure roll away from the knife, substantially as described.

In testimony whereof, I have signed my name to this specification in the presence of two subscribing witnesses.

GEORGE B. NORGRAVE.

Witnesses:
 JAS. H. CHURCHILL,
 J. MURPHY.